Aug. 13, 1929.  E. H. FORD  1,724,272
MAGNETIC METER MOTOR
Original Filed Aug. 7, 1926  2 Sheets-Sheet 1
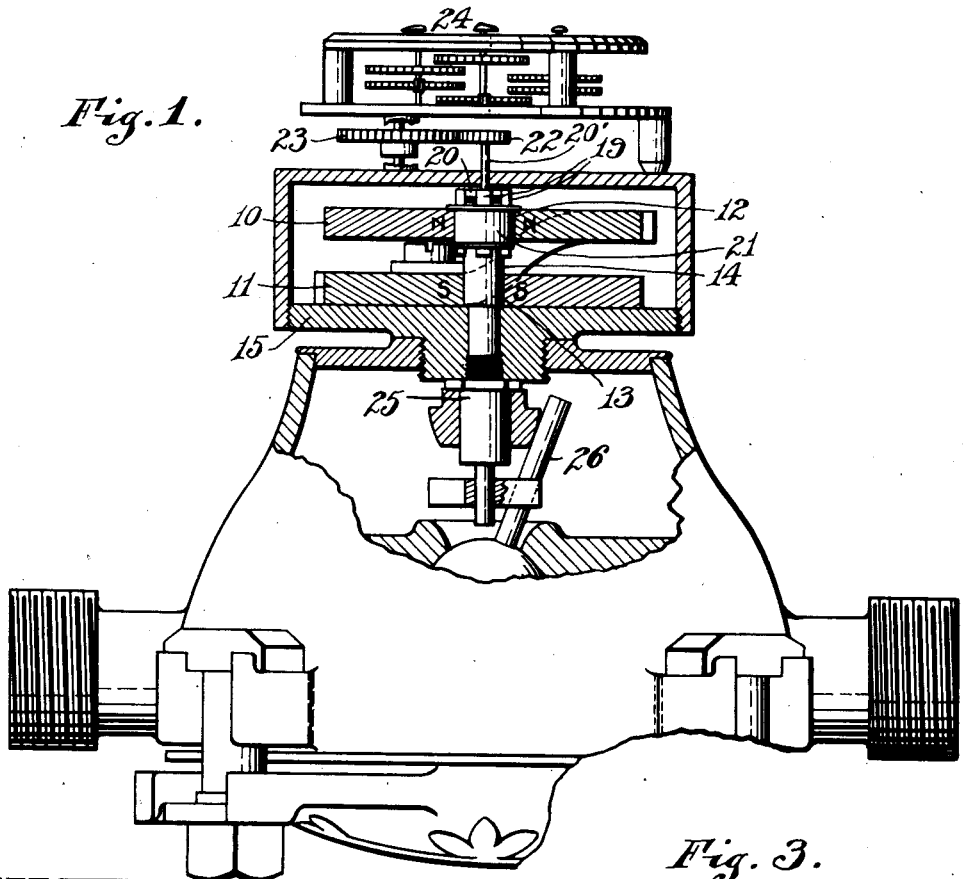
Fig. 1.
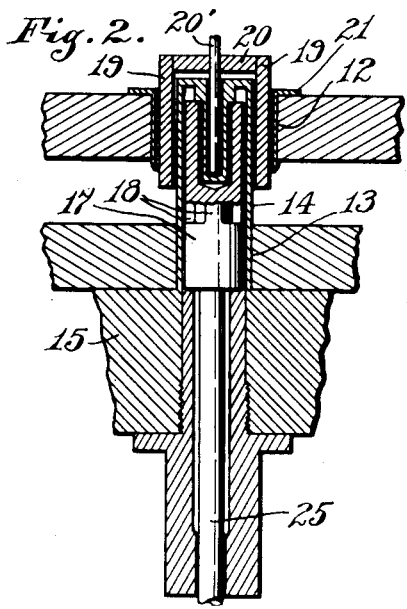
Fig. 2.
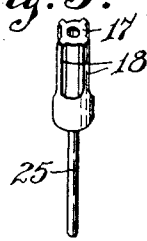
Fig. 4.
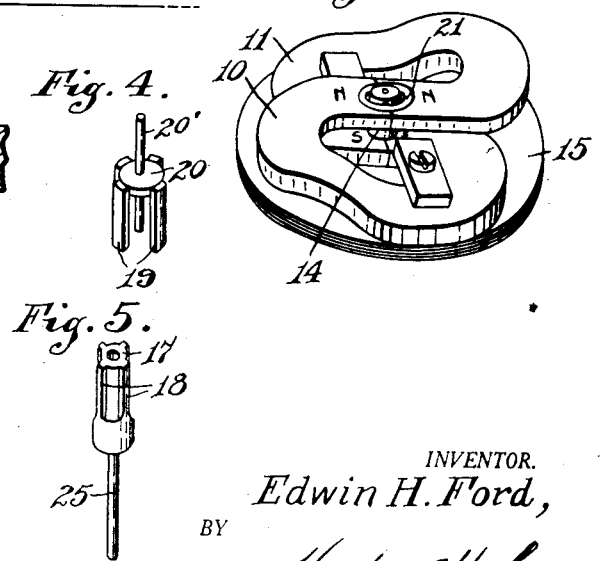
Fig. 3.
Fig. 5.
INVENTOR.
Edwin H. Ford,
BY
Hood + Hahn.
ATTORNEYS Patented Aug. 13, 1929.

1,724,272

UNITED STATES PATENT OFFICE.

EDWIN H. FORD, OF WABASH, INDIANA, ASSIGNOR TO FORD METER BOX COMPANY, OF WABASH, INDIANA, A CORPORATION OF INDIANA.

MAGNETIC METER MOTOR.

Application filed August 7, 1926, Serial No. 127,818. Renewed March 14, 1929.

The primary object of my invention is to provide an improved driving connection between the water-actuated element of a water meter and the metering train.

Stated somewhat more broadly the object of my invention is to produce a magnetic driving connection of improved form between a driving member and a driven member.

The accompanying drawings illustrate my invention.

Figure 6:
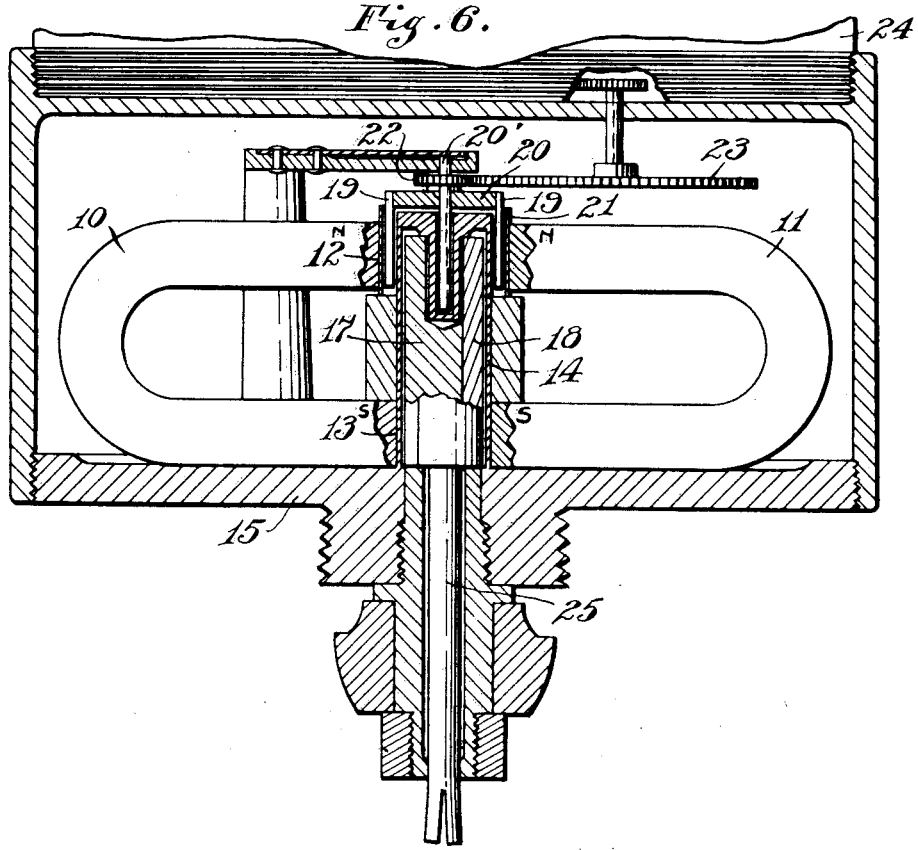

Fig. 1 is an element in partial vertical section of a water meter embodying my invention; Fig. 2 is a section on a larger scale through the magnetic coupling; Fig. 3 a perspective view of one form of permanent magnet; Fig. 4 a perspective view of a driven rotor shown in Fig. 1; Fig. 5 a perspective view of the driving rotor shown in Fig. 1; Fig. 6 a sectional view of modified form and Fig. 7 a perspective view of the permanent magnetic element and adjacent parts shown in Fig. 6.

Fundamentally, my invention comprises a permanent magnet having its opposite poles in different planes, and a rotative keeper extending between the poles, but not in contact therewith but within the magnetic field of the magnets comprising a driving rotor having radial extensions, and a driven rotor telescoped with the driving rotor and comprising several angularly separated portions, corresponding in number to the radial connections of the driving rotor and mounted for rotation. The rotors are of magnetic material and are separated, generally, by a non-magnetic material, said non-magnetic separately serving to seal the space, within which the driving rotor is mounted from the space in which the driven rotor is mounted.

In Fig. 1 of the drawings 10 and 11 indicate two permanent magnets, the north poles of which are arranged adjacent to each other in one plane and the south poles of which are arranged adjacent to each other in another plane, said two sets of poles being arranged in alignment with each other transversely.

A cylindrical passage 12 is formed through the adjacent north poles (they might as well be the south poles) and a cylindrical opening 13 is formed through the adjacent south poles, one-half of each opening being formed through each pole. A non-magnetic closed top tube 14, carried by the base structure 15 is projected through opening 13 and up into opening 12, the opening 12 being considerably larger than the opening 13. Journaled within the tube 14 is the magnetic driving rotor 17 formed with a series of angularly separated radial ribs 18. Sleeved over the tube 14 and projected through the opening 12, and extending down toward but not into contact with the south poles, are axially extending magnetic elements 19 of the driven rotor 20 said elements being angularly separated and co-ordinating with the ribs 18 of the driving rotor.

As it is quite desirable that the parts fit closely but without touching, I have found it desirable to sleeve the opening 12 with an accurately machined sleeve 21 of magnetic material, in contact with the poles of the magnet in which the opening 12 is formed. Rotor 20 is provided with a shaft 20' which, in the present instance, is connected by gear 22 with the gear train 23 of the meter register 24. Rotor 17 is carried by shaft 25 which may be driven, in the usual manner by the water impelled element 26 of an ordinary and standard water meter.

The magnetic support of the permanent magnets 10 and 11 is through the telescoped driving and driven rotors and as a result, when the shaft 25 is driven in the usual manner by the water impelled element of an ordinary standard water meter, a corresponding rotation will take place in the shaft 20' thereby driving the meter gear train 23 of the meter register 24.

Figure 7:
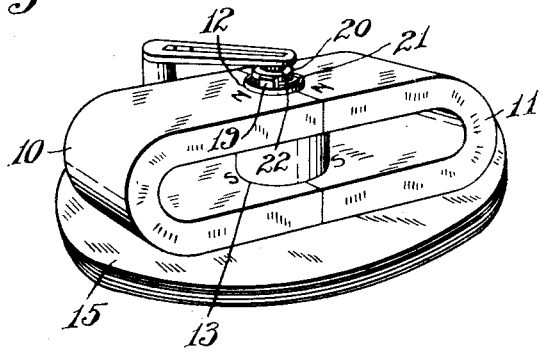

The construction shown in Figs. 6 and 7 is, to all intents and purposes, the same as has already been described. The permanent magnets are of a little different form and the rotors are of a slightly different form, the driven rotor having only two diametrically opposed ribs 18 and the driven rotor having only two elements 19.

It should be understood that the terms "driving rotor" and "driven rotor" are merely used for convenience and that either one of these elements may be the driving member and either one the driven member.

It should also be understood that the non-magnetic sealing tube 14 is not an essential between the two rotor elements, in many constructions although, in the water meter construction, the possibility of the insertion of such a sealing element is exceedingly important.

In water meter constructions and other similar constructions it will be noted that it becomes entirely unnecessary to provide any packing gland for the shaft 25. The sealing tube 14 prevents the egress of any water from the meter body and the presence of that water around the rotor 17 is not objectionable. Tube 14, however, prevents, without the use of packing glands, the entry of any water to the gear train which drives the meter register and thus eliminates one of the very great causes of annoyance and inaccuracy in such meter structures as are, to my knowledge, commonly in use.

As many permanent magnets may be grouped around a common axis as may be desired, and I have found that a single magnet is effective although, in that case, I have found that the provision of the sleeve 21, although not absolutely necessary, is nevertheless of material benefit especially if only semi-cylindrical openings are formed through the poles of the magnet.

It will also be understood that while, for the purposes for which my device has been primarily designed, a permanent magnet has been illustrated, a corresponding electromagnetic construction may be substituted therefor.

I claim as my invention:

1. In a magnetic coupling, the combination with a fixed permanent magnet having its poles adjacent one another and in different planes, of a rotative keeper extending between the poles and comprising a rotary element in the field of one pole but out of contact therewith and a second rotary element in the field of the opposite pole, said rotary elements projecting towards one another and overlapping and comprising coordinated axially extending angularly separated elements of magnetitc material, and a non-magnetic envelope arranged between the two elements of the keeper and enveloping one of them.

2. In a magnetic coupling, the combination with two fixed permanent magnets having their corresponding poles adjacent one another and their opposite poles in different planes, of a rotative keeper extending between the poles out of contact therewith and comprising a rotary element embraced by poles of the same polarity but out of contact therewith and a second rotary element similarly embraced by the opposite poles of the same polarity, said rotary elements projecting towards one another and overlapping and comprising coordinated axially extending angularly separated magnetic elements and a non-magnetic envelope arranged between the two rotary elements.

3. In a magnetic coupling, the combination with two fixed permanent magnets having their corresponding poles adjacent one another and their opposite poles in different planes, of a magnetic sleeve embraced by a pair of poles of the same polarity and a rotative keeper extending between the two sets of poles out of contact therewith and comprising a rotary element within said sleeve but out of contact therewith, a second rotary element embraced by the opposite set of poles of the same polarity, said rotary elements projecting toward one another and overlapping and comprising coordinated angularly extending, axially separated magnetic elements.

4. In a magnetic coupling, the combination with a fixed bi-polar magnet, of a rotary keeper therefor, said keeper comprising a rotary element associated with one of the poles of said magnet and projecting towards the other and having in its end a recess, a non-magnetic envelope enclosing the end of said element, having a closed end provided with an inwardly extending boss taking into the recess of said element, a second rotary element adjacent the opposite pole of the magnet and overlapping the first rotary element and having a shaft journaled in said inwardly extending boss, said rotary element comprising coordinated axially extending angularly separated magnetic elements.

5. In a magnetic coupling, the combination with two fixed permanent magnets having their corresponding poles adjacent one another and their opposite poles in different planes, of a rotary element embraced by one set of poles of the same polarity and having a recess in its end, a non-magnetic coupler envelope surrounding said rotary element and having a closed end provided with a boss taking into the recess in the end of the rotary element, a magnetic sleeve embraced by the opposite set of poles of similar polarity, a rotary element arranged in said sleeve and overlapping said first mentioned rotary element and having a shaft journaled in said inwardly extending boss, said rotary elements comprising coordinated axially extending angularly separated elements.

In witness whereof, I have hereunto set my hand at Wabash, Indiana.

EDWIN H. FORD.